United States Patent [19]

McNab et al.

[11] Patent Number: 4,465,293

[45] Date of Patent: Aug. 14, 1984

[54] VEHICLE OSCILLATION LOCK

[75] Inventors: William S. McNab, Chattanooga, Tenn.; Jerry A. Phifer, Peachland, N.C.

[73] Assignee: Envirotech Corporation, Salt Lake City, Utah

[21] Appl. No.: 437,497

[22] Filed: Oct. 28, 1982

[51] Int. Cl.³ ............................................. B60D 1/14
[52] U.S. Cl. .................................................. 280/474
[58] Field of Search ............... 280/474, 432, 462, 467, 280/478 R, 478 A

[56] References Cited

U.S. PATENT DOCUMENTS 2,898,126  8/1959  Loukonen ........................ 280/474

FOREIGN PATENT DOCUMENTS 880854  3/1954  Fed. Rep. of Germany ...... 280/474

Primary Examiner—Joseph F. Peters, Jr.
Assistant Examiner—D. Lynn Fugate
Attorney, Agent, or Firm—Robert E. Krebs

[57] ABSTRACT

An oscillation lock for an articulated mining vehicle having a front frame and rear frame with pivot means therebetween which prevents oscillation and possible tipping of the vehicle when hauling heavy front-mounted loads. The device includes a mounting plate attached to one of said frames cross-wise of the pivot link between the frames and a lock plate assembly including a pair of depending stop blocks which blocks and plates in assembled position straddle the pivot link and restrict oscillatory movement between the frames.

7 Claims, 6 Drawing Figures

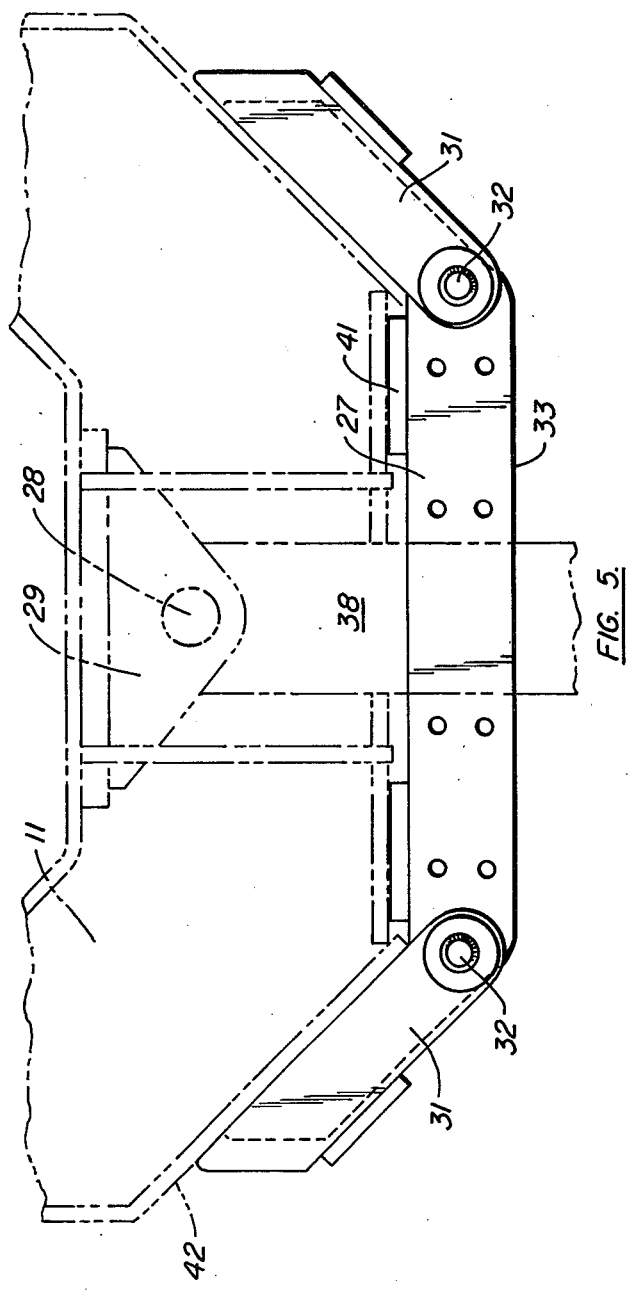
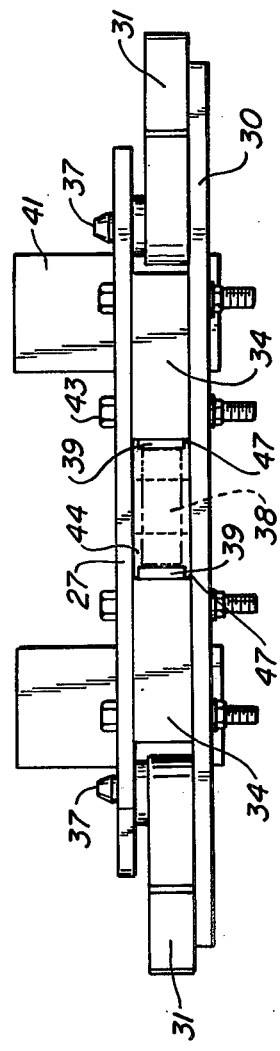

VEHICLE OSCILLATION LOCK

BACKGROUND OF THE INVENTION

The present invention relates to a device that restricts frame oscillation to near zero degrees in articulated steerable mobile vehicles, for example low height underground mining vehicles such as coal scoops and other haulage vehicles. It relates particularly to a locking device to increase the stability, safety and resulting overhung load capacity of a three-point articulated machine. A problem arises when an operator of such machine attempts to carry extremely heavy loads outside of the wheel-base of the machine and where the two main parts of the machine, a front frame part and a rear frame part, are at a substantial articulated angle with respect to each other. When loading heavy equipment on the front of the front frame, the rear frame becomes less and less an effective counterbalance to oscillation (and tipping) as the steering angle between the frames increase. This, results in possible instability by reason of a rear wheel raising above the ground. Traction is lost and the machine becomes difficult to maneuver.

FIELD OF THE INVENTION

The field of this invention is an oscillation locking device used on articulated steerable mobile machinery with a three-point type articulation. The term "three-point articulation" as used herein describes vehicle motion of one half of a frame relative to the other half while being rigidly attached through three ball sockets (three points) and pins. The lower link allows the two frame halves to swing almost independently so this is referred to as oscillation. The oscillation lock prevents the oscillation or tipping of the vehicle when a heavy load, such as a longwall roof support, is being carried by the load-carrying member extending forward of the front frame of the machine. Thus, an object of the invention is to provide an oscillation lock which will increase the stability, safety and resulting load-carrying capacity of a three-point articulated vehicle particularly when that vehicle is used to temporarily carry extremely heavy loads outside its wheel base.

SUMMARY OF THE INVENTION

The oscillation lock of this invention includes a mounting plate which is permanently affixed by welding or the like to a rear surface of the front frame of the articulated vehicle. This mounting plate extends laterally on both sides of a pivot link which connects the front frame to the rear frame of the vehicle. When it is desired to lock the vehicle from excess oscillation or the possibility of tipping, a laterally-extending lock plate having aperture means and spaced stop blocks is engaged with the mounting plate in parallel orientation so that the pivot link between the front and rear frames extends between the stop blocks and between the mounting plate and the lock plate. The device thereby will limit the articulation of the vehicle and particularly limits the amount of relative rotation between the rear frame and the front frame. This prevents excess or any oscillation which may cause tipping of the vehicle rear frame and resultant loss of traction and safe operation.

BRIEF DESCRIPTION OF THE DRAWINGS

FIG. 5 is a top view of the oscillation lock structure.

FIG. 6 is an end view of the oscillation lock structure in assembled condition.

DETAILED DESCRIPTION OF THE INVENTION

Figure 1:
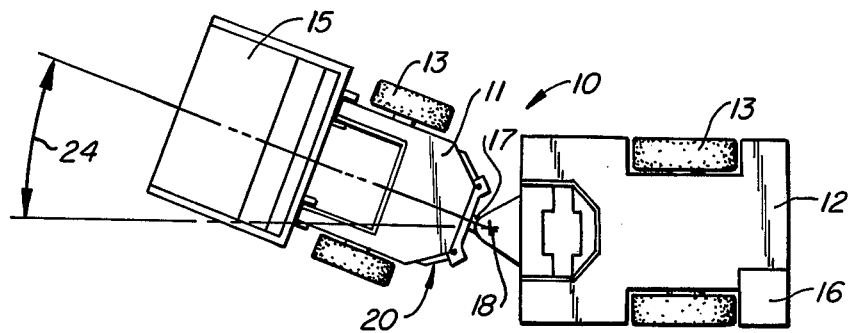
FIG. 1 is a simplified plan view of a typical articulated vehicle showing the top of the oscillation lock.

FIG. 1 shows a plan view of a simplified form of articulated vehicle 10 which comprises a front frame 11 and a rear frame 12 each carrying a set of wheels 13 and non-steering axles. Extending forwardly of front frame 11 is bucket, loader, scoop, forklift or the like 14 which is termed herein the "load-carrying unit". Unit 14 is normally controlled by mechanical linkages to hydraulic mechanisms and valving carried by front frame 11 which function to pick-up for transit and lower for discharge loads which are being carried by the load carrying unit. These mechanisms are also used in other operations for which the vehicle is designed. Rear frame member 12 typically includes an operator's compartment 16 where the vehicle operator sits and controls the movement and work operations of the articulated vehicle. An upper pivot clevis 17 connected to the front frame 11 and a clevis 18 connected to the rear frame 12 provides the common fixed point between the frames. The oscillation lock mechanism 20 of this invention is shown affixed to the rear portion of frame 11. The front frame 11 may be articulated angularly with respect to rear frame 12 in varyinq degrees, for example within a combination of angles 23 and 24, dependent on the desired turning angle or angle at which work is to be performed. This type of vehicle is particulary useful in undulating bottom passageways in underground mines.

Figure 2:
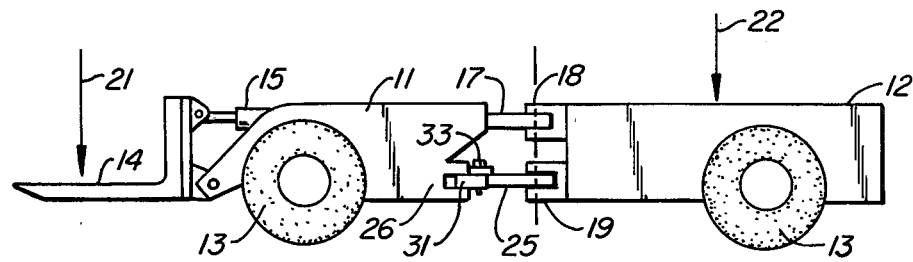
FIG. 2 is a side view of the articulated vehicle.

FIG. 2 shows a side view of the articulated vehicle and particularly upper point 18 and lower pivot link 25 which makes up the typical articulated joint. The dot-dash line represents the hinge line for steering. The oscillation lock of this invention is fitted to the rear of the front frame 11 of an articulated vehicle as shown by 26. Hydraulic lift mechanism 15 controls the elevation of load-carrying unit 14. A typical placement of a critical load weight is shown at 21. This load weight is normally counterbalanced by the weight 22 of the rear frame 12 when the frames are in a straight relationship. Clevis 18 and clevis 19 connected to rear frame 12 are pinned to pivot 17 and link 25 respectively. Each frame half has three load points, one each where the two wheels of one axle touch the ground and the common upper pivot point.

Figure 3:
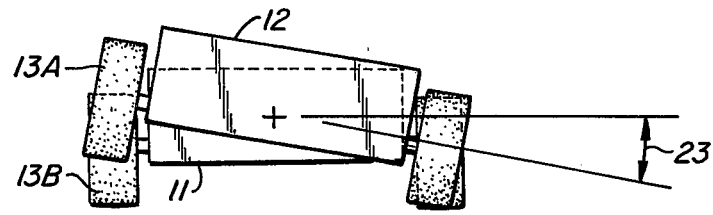
FIG. 3 is a rear view of the articulated vehicle in an unstable position.

FIG. 3 shows the effect of excess front loading of the articulated vehicle on the rear frame. This occurs when the frames 11 and 12 are in an articulated position and the lower link has shifted sideways. Due to the lack of counterbalancing weight of the rear frame, the wheel 13a of the rear frame tends to tip upwardly with respect to the wheel 13b of the front frame making the situation worse. Because the rear wheels no longer contact the ground (4 wheel drive), this gives less traction and the machine is put in an unsteerable, unstable position. It is this condition that the oscillation lock of this invention seeks to prevent. Angle 23 is the degree of oscillation resulting in the undesirable operating condition. It also is the angle for normal safe operation when all 4 wheels are on the ground.

Figure 4:
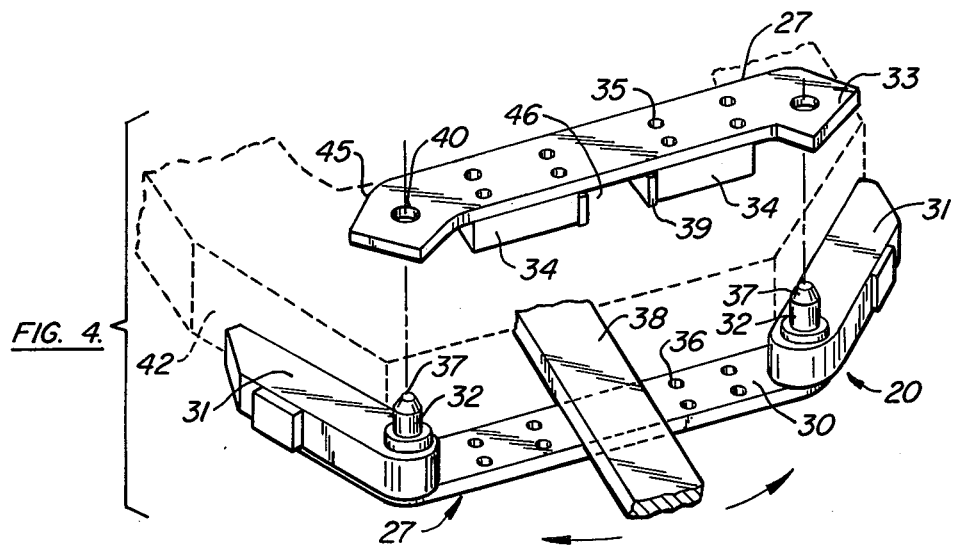
FIG. 4 is an exploded view of the oscillation lock structure shown in juxtaposition to the phantom lines of a rear deck of the front frame part of an articulated vehicle.

FIG. 4 shows in detail the oscillation lock 20 of this invention. It comprises a lock mounting or mount plate 30 oriented and attached to the rear frame deck 42 of the front frame of the vehicle by angular members 31. The angularity or shape of the members 31 generally will be dictated by the available mounting structure on the rear deck of the front frame. Lock mount plate 30 normally includes two upstanding pins 32 which function to aid in the correct assembly of a lock plate assembly 33. Assembly 33 comprises a generally flat plate 27 having apertures 35 therein and a pair of rectangular stop blocks 34 in laterally spaced position on the underside of plate 27. Stop blocks 34 are welded to plate 27. Similarly, the mounting plate 30 and its assembled arms 31 are a welded assembly which is in turn welded to the rear 26 of the frame 11. Apertures 36 are contained in mount plate 30 in a pattern corresponding to apertures 35 so that bolts may be inserted therethrough to connect the lock plate to the mounting plate. In assembly shims 39 are provided which are welded as required to the side of stop blocks 34 and aside pivot link 38 both facing sides of block 34. Likewise, the horizontal distance between the stop blocks 34 controls the degree of oscillation. Ears 33 hold horizontal angular steering to typically 35° each side of center. Apertures 40 are provided in the lock plate 27 which are oriented with vertical cantilevered mounting pins 32. For ease of assembly, a tapered pin end 37 is provided on pins 32. In a typical installation a curved and angular end 45 is provided on lock plate 27 to prevent restriction of steering angle.

FIG. 5 shows a top plan view of the lock plate assembly 33 with its lower lock plate 30 and extended members 31 which are attached to the rear deck 42 of frame rear 26. Pivot link 38 which is cross-wise juxtaposed to the lock plate assembly extends into clevis 29 on the front frame and pinned by socket pin 28.

FIG. 6 shows an end view of the overall locking assembly showing both lock plate 27, mounting plate 30, with stop blocks 34 extending therebetween so that link 38 is horizontally positioned on the machine centerline. Mounting bracket 41 is provided for reinforcement and attachment of plate 30 to the vehicle frame. Shim spaces 47 are provided to adjust link motion sideways to zero. Upper space 44 remains after assembly of the device. Care should be taken in attaching the lock plate to the mount plate previously permanently affixed to the frame. The machine vehicle should be in a straight line (unarticulated) on level ground. The lock plate is dropped over the pins upstanding from the mount plate and the plates securely bolted together. So as to use the machine in its full design specifications the lock plate is normally mounted on the vehicle only when it is desired to load and haul particularly heavy items of mine equipment.

While the invention has been described in terms of the mounting plate affixed to the rear of the front frame, it is within the scope of this invention to mount with proper design the device to the front of the rear frame.

The oscillation lock plate is used and is most effective when the type and weight of the added load carried by the machine shifts a significant portion of the total machine weight to the outside of the wheel base normally in front of the forward frame causing instability and maneuverability problems. Once the lock plate is installed on the permanently installed mount plate, the link can be locked in place which results in little or no oscillation movement between the front and rear frame. Removal of the lock plate from the mount plate conversely allows the machine to be operated in its normal functions and the mount plate remaining on the frame has no effect on the allowable articulation or oscillation designed into the machine itself. The advantages of the use of the oscillation lock on machines to which it is adapted is increased utility of the machine for the operator and increases the safety of operation in the hauling of large heavy loads underground.

The scoop with fork attachment, for example, is used to haul a load of steel roof supports (shields or chocks) for the mine in which event the weight is such that in an articulated configuration the rear frame cannot effectively act as a counterbalance to this added weight. It is under these work conditions that the oscillation lock plate is bolted into place on the mount plate and the device acts to prevent undue oscillation of the rear frame with respect to the front frame. When carrying a large load and the machine is articulated, the three-point articulation no longer allows the rear frame weight to act as an effective counterbalance. The rear frame will oscillate with respect to the front frame. As this occurs, the rear frame becomes unstable. The inside rear wheel will remain in contact with the ground while the outside rear wheel will lose contact. The rear frame will continue to oscillate to its maximum design point causing the outside rear wheel to rise above the ground. At this point the machine is difficult to maneuver due to lost traction by the rear wheels.

When the machine's oscillation is locked by use of the lock plate assembly, the rear frame weight is available at all degrees of permitted articulation to effectively counter-balance the added front frame load.

We claim:

1. In a front-end loading vehicle having a front frame articularly connected to a rear frame by an elongated pivot link mounted to pivot about a generally vertical axis at its one end, the improvement which comprises: a laterally-extending mounting plate affixed to one of said frames facing the other of said frames and extending in cross-wise juxtaposition to the pivot link, a laterally-extending lock plate having means for selective engagement with said mounting plate in parallel orientation with said mounting plate, a pair of spaced stop blocks attached to said lock plate to extend between said mounting plate and said lock plate in assembled position with said elongated pivot link extending between the spaced stop blocks, said pivot link and stop blocks being sized to abut against longitudinally-extending surfaces of said elongated pivot link to restrict oscillatory movement of one frame with respect to the other frame about the longitudinal axis of said pivot link.

2. The invention as set forth in claim 1 further including means to removably and fixedly attach said lock plate.

3. The invention as set forth in claim 2 in which last mentioned means are a pattern of oriented apertures in said mounting plate and said lock plate with bolts extending therethrough.

4. The invention as set forth in claim 1 in which the inner peripheral surface of said mounting plate conforms to angular surfaces on the rear plane of said front frame.

5. The invention as set forth in claim 1 wherein said stop blocks are integrally attached to said lock plate.

6. The invention as set forth in claim 1 further including cantilevered pin means extending from a top surface of such mounting plate and wherein said lock plate has aperture means for guiding engagement with said pin means.

7. The invention as set forth in claim 1 further including means forming a horizontal, almost zero, clearance between the facing edges of said stop blocks and said pivot link to restrict angular horizontal articulation between said frames.

* * * * *